United States Patent [19]
Dealey, Jr. et al.

[11] Patent Number: 5,752,760
[45] Date of Patent: May 19, 1998

[54] LIGHTING SYSTEM FOR MASS-TRANSIT VEHICLES

[75] Inventors: Onward K. Dealey, Jr., Waterford; Ben V. Domas, Oakland; Alvin D. McCauley, Holly, all of Mich.

[73] Assignee: Transmatic, Inc., Waterford, Mich.

[21] Appl. No.: 902,826

[22] Filed: Jul. 30, 1997

Related U.S. Application Data

[63] Continuation of Ser. No. 595,664, Feb. 2, 1996, abandoned, which is a continuation-in-part of Ser. No. 471,395, Jun. 6, 1995, abandoned.

[51] Int. Cl.$^6$ .................... B60Q 3/00; F21V 7/00
[52] U.S. Cl. .................... 362/32; 362/74; 362/80; 40/547
[58] Field of Search .................... 362/32, 61, 74, 362/80, 83.3, 75, 73, 151, 329, 330, 332, 367, 294, 373; 40/547, 553, 556; 296/208, 37.7, 37.8

[56] References Cited

U.S. PATENT DOCUMENTS

| | | | |
|---|---|---|---|
| 2,372,874 | 4/1945 | Zimmerman | |
| 2,561,756 | 7/1951 | Shook | 362/32 |
| 2,587,807 | 3/1952 | Arenberg et al. | 362/74 |
| 3,210,875 | 10/1965 | Schwenkler | 40/129 |
| 4,157,584 | 6/1979 | Bhatt | 362/74 |
| 4,387,415 | 6/1983 | Domas | 362/74 |
| 4,574,336 | 3/1986 | Mikalonis | 362/260 |
| 4,704,660 | 11/1987 | Robbins | 362/32 |
| 4,713,738 | 12/1987 | Davis | 362/296 |
| 4,740,870 | 4/1988 | Moore et al. | 362/32 |
| 4,811,172 | 3/1989 | Davenport et al. | 362/61 |
| 4,947,293 | 8/1990 | Johnson et al. | 362/32 |
| 4,947,305 | 8/1990 | Gunter, Jr. | 362/297 |
| 5,113,322 | 5/1992 | Mikalonis | 362/74 |
| 5,122,933 | 6/1992 | Johnson | 362/32 |
| 5,136,491 | 8/1992 | Kano | 362/346 |
| 5,184,883 | 2/1993 | Finch et al. | 362/32 |
| 5,420,763 | 5/1995 | Vanderhoof | 362/74 |
| 5,432,876 | 7/1995 | Appeldorn et al. | 362/32 |
| 5,441,326 | 8/1995 | Mikalonis | 362/74 |
| 5,483,427 | 1/1996 | Dealey, Jr. et al. | 362/80 |
| 5,495,400 | 2/1996 | Currie | 362/32 |

FOREIGN PATENT DOCUMENTS

| 06298003 A | 4/1993 | Japan | 362/75 |
|---|---|---|---|

*Primary Examiner*—Thomas M. Sember
*Attorney, Agent, or Firm*—Reising Ethington PLLC

[57] ABSTRACT

A lighting system for preferentially illuminating the seating area of a mass-transit vehicle passenger compartment while minimizing the illumination of an aisle and of side windows of the vehicle. A lighting fixture is mounted in a cornice area of the vehicle above the seating area. The fixture includes an air duct extension panel having an outer edge that connects to a sidewall of the vehicle and extends horizontally inward over the seating area. An elongated lamp housing is integrally formed as a unitary piece with the air duct extension panel and is disposed along an inner edge of the extension panel opposite the outer edge. A face panel connects between a ceiling of the vehicle and the extension panel inner edge. The face panel spaces the lamp housing downward from the vehicle ceiling toward the seating area to maximize seating area illumination. The air duct extension panel spaces the lamp housing inwardly away from the sidewall and side windows to minimize side window illumination.

20 Claims, 11 Drawing Sheets

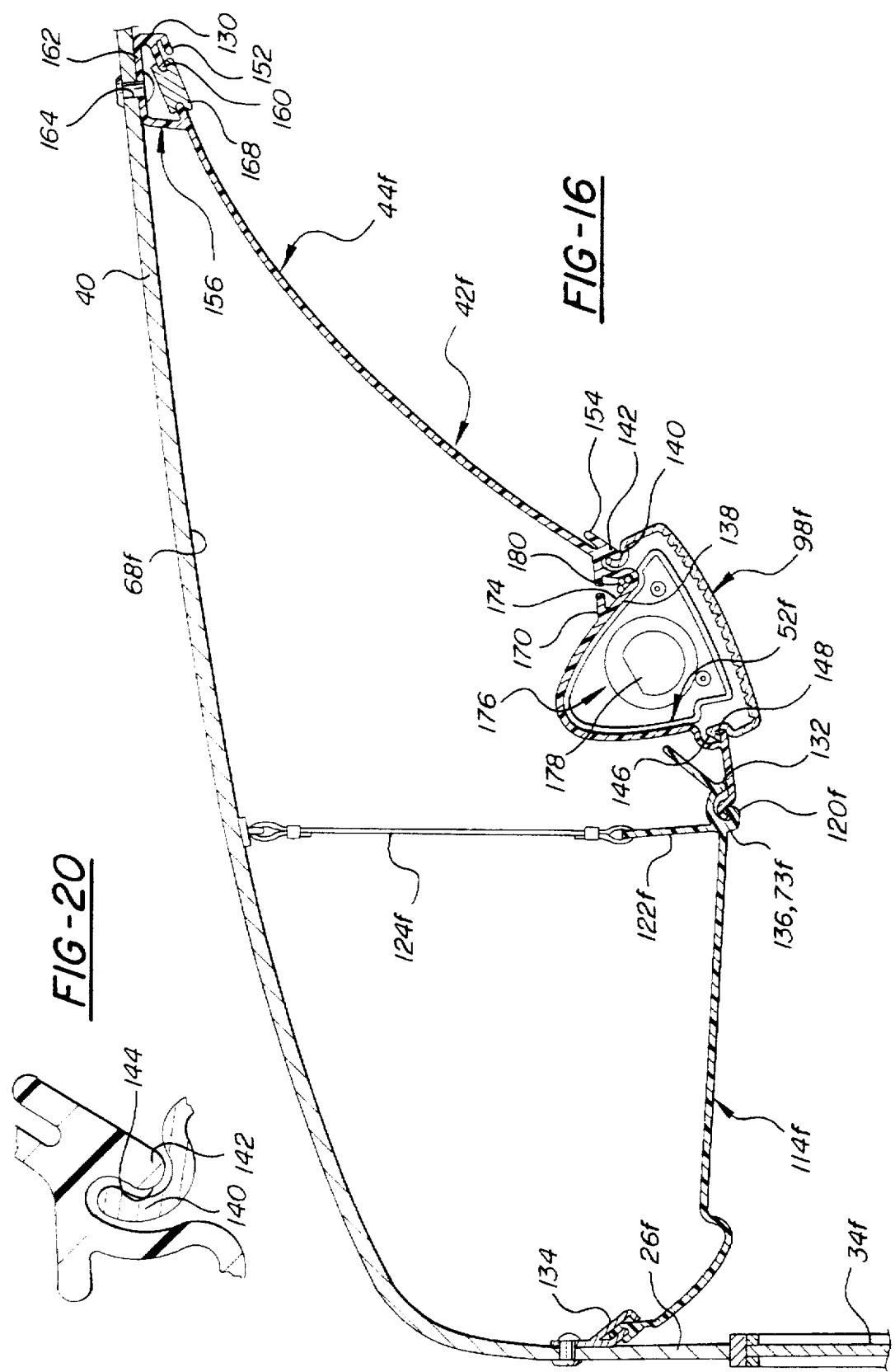

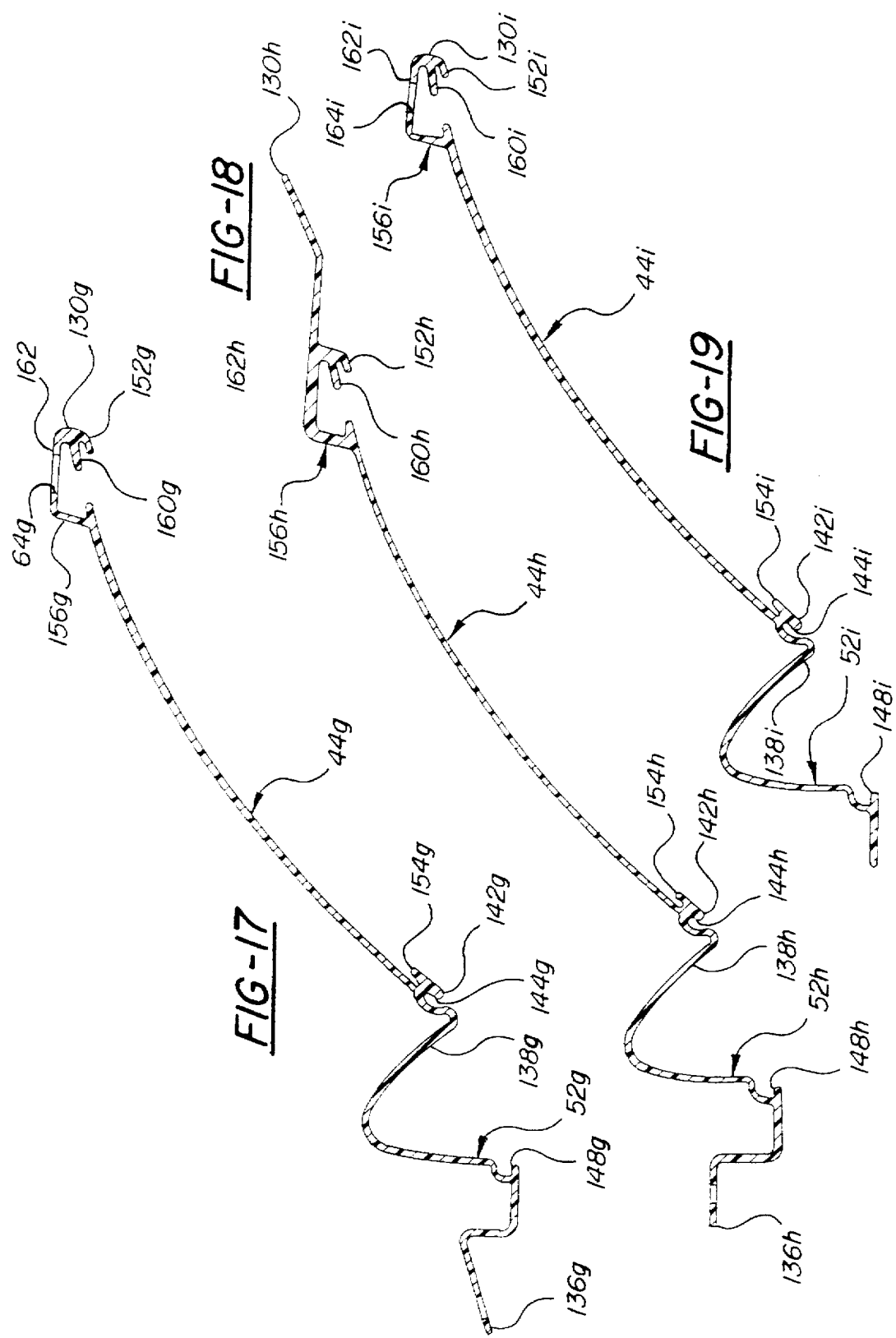

LIGHTING SYSTEM FOR MASS-TRANSIT VEHICLES

This application is a continuation of application Ser. No. 08/595,664 filed on Feb. 2, 1996, now abandoned which is a continuation in part of application U.S. Ser. No. 08/471,395 filed Jun. 6, 1995, now abandoned.

TECHNICAL FIELD

This invention relates to mass transit vehicle lighting systems; more particularly, it relates to a lighting system for the passenger compartment of a bus using light pipes.

BACKGROUND OF THE INVENTION

Lighting systems for passenger seating areas in mass-transit vehicles frequently include a plurality of fluorescent lamps arranged in rows. Each row of lamps is commonly enclosed within an elongated channel that forms part of an elongated lamp housing. The elongated channel may be connected to or integrally formed with an elongated display panel for holding advertising cards. A lamp housing of this type will also typically include an elongated translucent or transparent light cover disposed across the open side of the channel to aid in controlling the distribution of light emitted from the lamps.

Together, the lamp housing and display panel make up an elongated light fixture. Such light fixtures are typically manufactured in long sections that mount end-to-end in the cornice areas above the passenger seating areas and above the vehicle side windows in mass-transit vehicles. U.S. Pat. No. 4,574,336 issued Mar. 4, 1986 to Mikalonis and U.S. Pat. No. 4,387,415 issued Jun. 7, 1983 to Domas disclose lighting systems of this type.

Fluorescent vehicle lighting systems are inherently difficult to service and require a considerable amount of maintenance. Fluorescent lamps frequently burn out and require replacement. When lighting systems use large numbers of lamps, the odds that one of the lamps will burn out over a given period of time increases. Therefore, the larger the number of lamps that a lighting systems uses, the more often that system will require bulb replacement.

Lighting systems that use multiple lamps also require multiple lamp sockets and complex wiring harnesses. Wiring harnesses for multiple-lamp lighting systems must connect every lamp socket to an electrical power source. In addition, the lighting fixtures housing the lamps must be designed to allow easy access for the purpose of removing burned-out lamps and installing new ones.

Systems using multiple lamps inherently leave "dark spots" between lamps. Rows of fluorescent lamps oriented end-to-end leave dark spots where the ends of each lamp plug into a socket. The dark areas between the lamps are difficult to minimize without extending the lengths of the lamps.

When confronted with applications requiring linear light sources, designers have sometimes turned to fiber optics. Advances in fiber optic technology have made it possible to manufacture linear light sources that can efficiently distribute light both laterally from their circumferences as well as longitudinally from their ends. This type of product is known as a "side-light" or "side-fire" optic or a "side-fire" light pipe.

Lumenyte International Corporation manufactures a "side-fire" light pipe that includes a solid acrylic core with either a circular or an oval cross-section. The diameter of the core is approximately one-half of an inch. A Teflon® cladding surrounds the core and has an index of refraction that causes the light pipe to emit light laterally. A clear jacket surrounds the cladding to reflect a certain amount of light back into the core.

Also available from Lumenyte International Corporation is the LUMENYTE® STARBURST™ OPTIC—a side-fire light pipe with small angled cuts along its length. The cuts create optical discontinuities along the length of the light pipe that increase the amount of light emitted laterally. The depth, angle and spacing of these cuts can be varied to customize light distribution to suit a particular application.

The prior art also includes fiber optic lighting systems that have been proposed for use in vehicular applications. An example of a proposed vehicular application of fiber optic technology is described in U.S. Pat. No. 4,947,293 issued to Johnson et al. The Johnson et al. patent discloses a clearance lighting system for a semi trailer cargo container body. The system includes a light source that end-illuminates elongated light-conducting strips. The strips are supported along both sides of a container body and emit light both longitudinally and laterally. Another Johnson patent, U.S. Pat. No. 5,122,933, discloses a similar fiber optic lighting system that includes a message panel. However, the lighting systems disclosed in these two patents are not adapted to preferentially distribute light into the passenger seating area of a mass transit vehicle.

Another example of a vehicular application for fiber optic technology is disclosed in U.S. Pat. No. 4,740,870 issued to Moore et al. The Moore et al. patent discloses a fiber optic lighting system for boats. The system includes a plurality of "end-fire" fiber optic cables that each receive light at one end from a central light source. The cables conduct light longitudinally to light fixtures located at remote locations within a boat.

Two other examples are disclosed in U.S. Pat. No. 4,811,172 to Davenport et al. and U.S. Pat. No. 5,184,883 to Finch et al. Each of these patents discloses a fiber optic lighting system for motor vehicles. The systems include a light source that end-illuminates a plurality of fiber optic filaments. The filaments conduct the light longitudinally to the vehicle head and tail lamp fixtures.

There remains a need for lighting systems that can supply sufficient illumination to meet lighting requirements in passenger seating areas of mass-transit vehicles while reducing the amount of lamps, wiring and maintenance that current systems require.

SUMMARY OF THE INVENTION

In accordance with this invention, an improved lighting system is provided for illuminating a passenger seating area in a mass transit vehicle. The improved system replaces fluorescent tubes with one or more optically-coupled light pipes. The light pipes preferentially distribute light into the passenger seating area while reducing the amount of lamps and maintenance required.

Light pipes may be formed into segments much longer than a fluorescent tube thus minimizing the number of "dark spots" along the length of a light fixture. Because they conduct light, several light pipes may be arranged end-to-end, in series, to extend from a single light source. As a result, with the exception of the light source, there are no lamps to burn out and require replacement. Such a system does not need complex wiring harnesses because there are fewer lamps and therefore fewer lamp sockets requiring electrical power. Moreover, light sources for illuminating light pipes can be selected that do not require the heavy inverter ballasts that fluorescent lamps require.

In accordance with a fifth embodiment of this invention, a lighting system is provided which can be used with either light pipes or fluorescent lamps. The system includes a plurality of light fixtures, each having a pair of end caps disposed at either end of an elongated lamp housing. Each end cap may include either a D-shaped through hole to receive a fluorescent bulb socket or a circular hole to receive a light pipe.

To better understand and appreciate the invention, refer to the following detailed description in connection with the accompanying drawings:

BRIEF DESCRIPTION OF THE DRAWINGS

FIG. 10 is a detail view of a light pipe extending between two light sources;

FIG. 16 is a cross-sectional end view of a fifth light fixture embodiment constructed in accordance with this invention;

FIG. 17 is a cross-sectional end view of an alternative face panel;

FIG. 18 is a cross-sectional end view of another alternative face panel; and

FIG. 19 is a cross-sectional end view of yet another alternative face panel.

FIG. 20 is a broken-out cross-sectional end view of the roll-in lens connector arrangement shown in FIG. 16.

DETAILED DESCRIPTION OF THE PREFERRED EMBODIMENT

Figure 1:
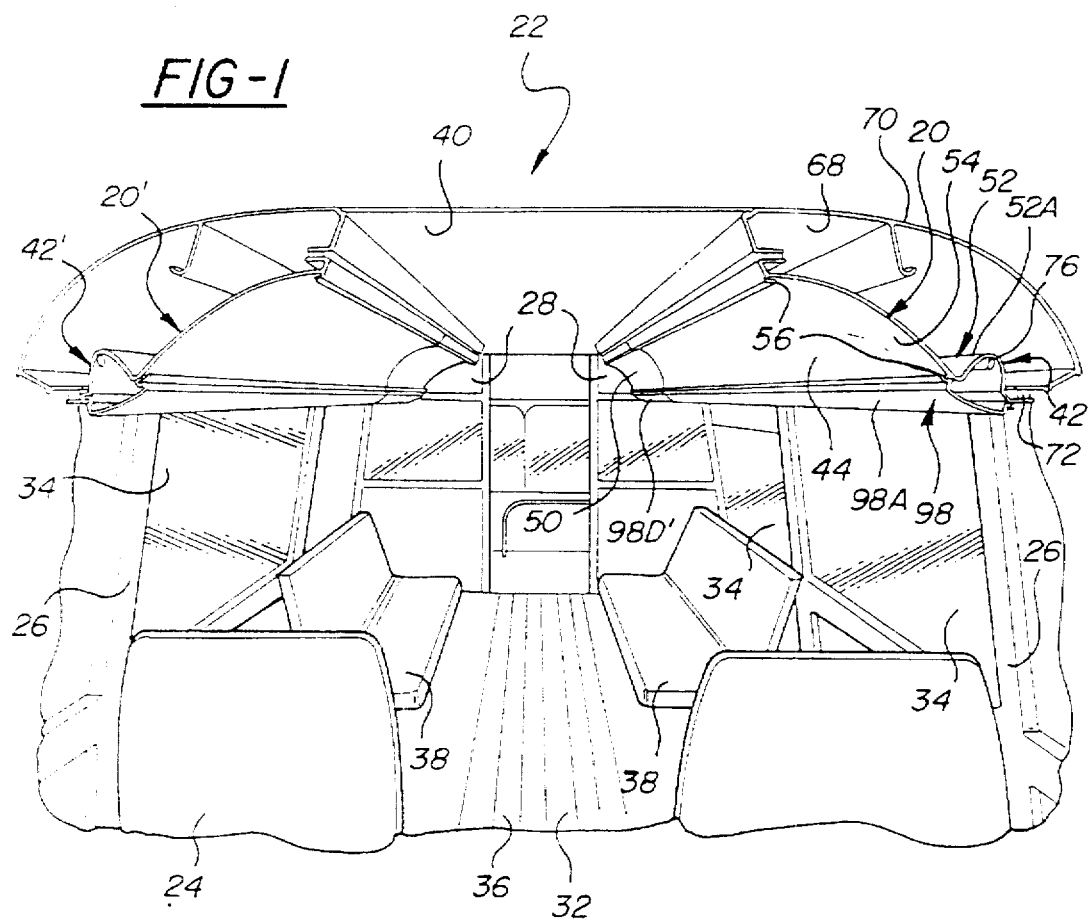
FIG. 1 is a perspective view of a vehicle interior having light fixtures according to the invention.

A first embodiment of a lighting system for mass-transit vehicles is generally indicated at 20 and 20' in FIGS. 1–4. The lighting system 20, 20' is installed in a mass transit vehicle 22 that includes a passenger compartment, generally indicated at 24 in FIGS. 1–3. The passenger compartment 24 is defined by two side walls 26, a forward bulkhead 28 and an aft bulkhead 30, a floor 32 and a ceiling 40. The forward bulkhead 28 is located at the forward end of the passenger compartment and the aft bulkhead 30 is located at the aft end. The passenger compartment 24 includes side windows 34 located in the side walls 26. The floor 32 includes an aisle 36 extending along the longitudinal axis of the vehicle 22 between two passenger seating areas 38. The ceiling 40 extends between the side walls 26 from the forward bulkhead 28 to the aft bulkhead 30. The passenger compartment 24 includes two cornice areas defined as the regions where the two side walls 26 join the ceiling 40. Portion 20 of the lighting system is supported in one cornice area and portion 20' is supported in the opposite cornice area. An elongated vehicle duct panel 70 may also be fixed into the cornice area.

Figure 2:
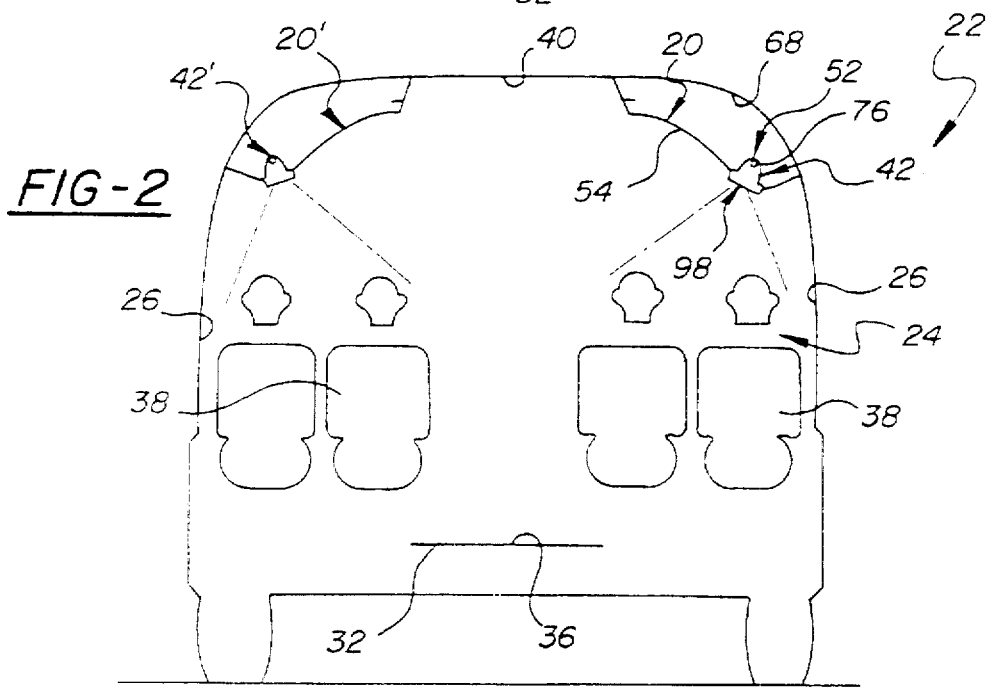
FIG. 2 is a cross-sectional view of a vehicle schematically showing the lighting pattern from the fixtures according to the invention.
Figure 3:
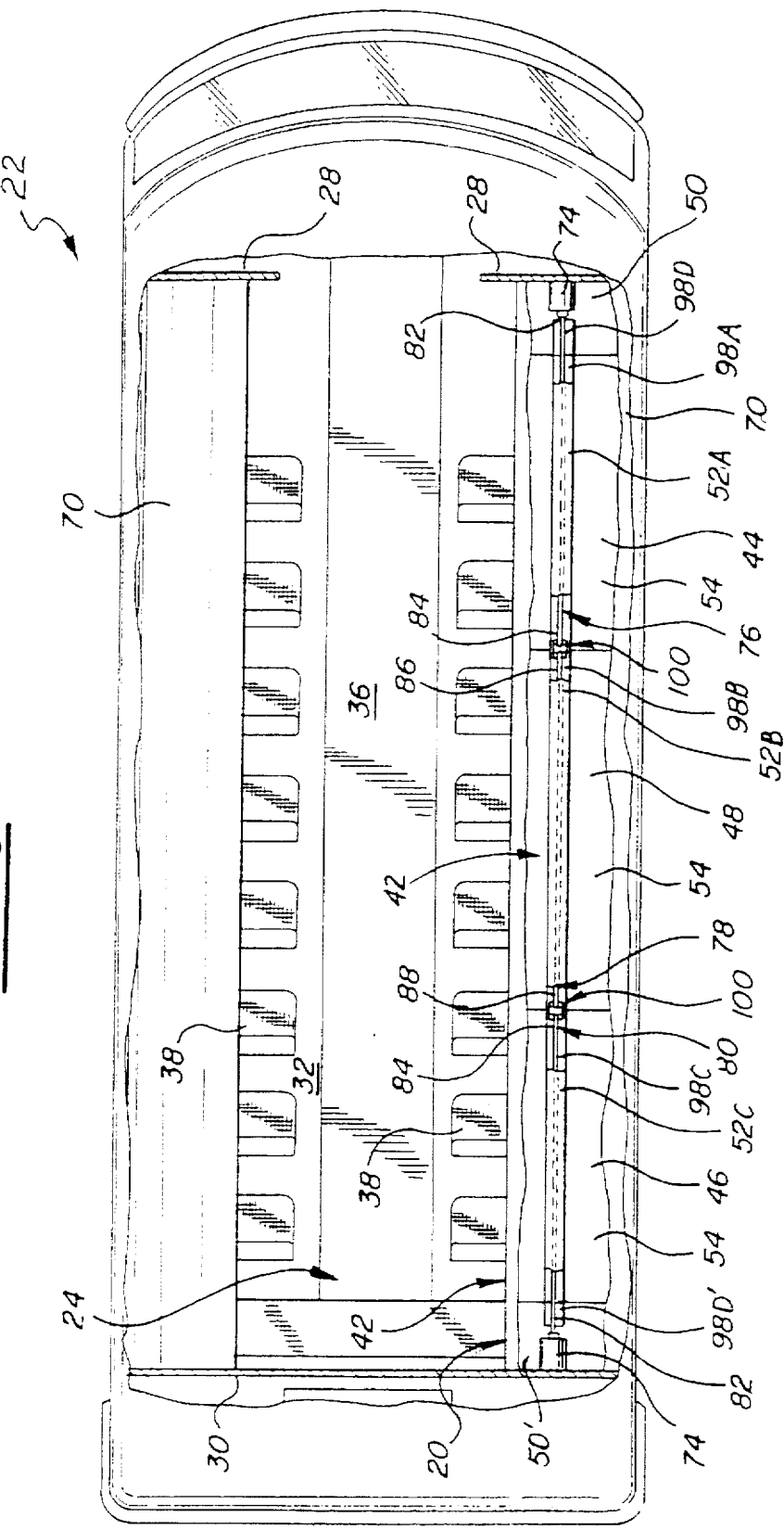
FIG. 3 is a partial-cutaway top view of the vehicle shown in FIG. 1.

Because lighting system portions 20, 20' have the same general construction, only lighting system 20 will be described in detail. As shown in FIGS. 1, 2 and 3, the lighting system 20 includes an elongated light fixture 42 installed longitudinally in one of the cornice areas in the passenger compartment 24 of the vehicle 22. One light source 74 is mounted at each end of the light fixture 42 adjacent a bulkhead 28, 30. Three elongated light pipes 76, 78, 80 are optically-coupled end-to-end and extend between the two light sources 74. (Other embodiments may, of course, include a greater or a smaller number of light pipes.) The light pipes 76, 78, 80 receive light from the light sources 74, transmit it along their lengths and laterally emit it from along their lengths into the passenger compartment 24. The light fixture 42 also includes an elongated segmented lamp housing 52 that runs parallel to the light pipes 76, 78, 80 and preferentially directs light into the seating area 38 from the light pipes 76, 78, 80. Two coupler means 100 are supported at spaced locations along the lamp housing 52 to slidably support the optically-coupled ends 84, 86, 88 of the light pipes 76, 78, 80.

As shown in FIG. 3, the light fixture 42 includes five face panels 44, 46, 48, 50, 50' disposed end-to-end and longitudinally extending above the seating area 38 from the aft bulkhead 30 to the forward bulkhead 28. The five panels include a 12 foot-long forward face panel 44 disposed in the forward end of the passenger compartment 24, a 12 foot-long aft face panel 46 disposed in the aft end of the passenger compartment 24, a center face panel 48 disposed between the forward 44 and aft 46 face panels, a forward access face panel 50 abutting the forward bulkhead 28, and an aft access face panel 50' abutting the aft 30 bulkhead. The length of the center face panel 48 varies according to the length of the passenger compartment 24. The face panels 44, 46, 48, 50, 50' have generally identical cross-sections as viewed longitudinally down the length of the passenger compartment 24.

As is best shown in FIGS. 1 and 2, the segmented lamp housing 52 is longitudinally disposed in the light fixture 42. The segmented lamp housing 52 is made-up of three interconnecting lamp housing segments 52A, 52B, 52C, each shaped and aimed to preferentially direct light to the seating area 38 below and to minimize illumination of the aisle 36 and side windows 34. The lamp housing segments are aligned end-to-end to form the segmented lamp housing. Each segment 52A, 52B, 52C, 52D, 52D' of the lamp housing 52 is disposed in one of the face panels 44, 46, 48. A forward lamp housing segment 52A is disposed in the forward face panel 44, an aft lamp housing segment 52B is disposed in the aft face panel 46, a center lamp housing segment 52C is disposed in the center face panel 48. Each lamp housing segment 52A, 52B, 52C, has the shape of a concave channel with a parabolic cross-section. The cross-sectional shape of each lamp housing segment 52A, 52B, 52C, may also be elliptical, semi-circular or any other suitable shape. The curved inner surface of each panel segment 52A, 52B, 52C, 52D, 52D' may include a light reflecting, refracting, diffusing or absorbing surface—depending on the amount of illumination desired for a given application.

Each face panel 44, 46, 48, 50, 50' includes a gently-curved display panel 54 and upper and lower grooved borders 56 for holding advertising cards. The lower edges of each face panel 44, 46, 48, 50, 50' include an elongated, downwardly-curved roll-in hook 73 for mounting the panels 44, 46, 48, 50, 50' in another embodiment. In the first embodiment, the hooks 73 serve no purpose.

Figure 4:
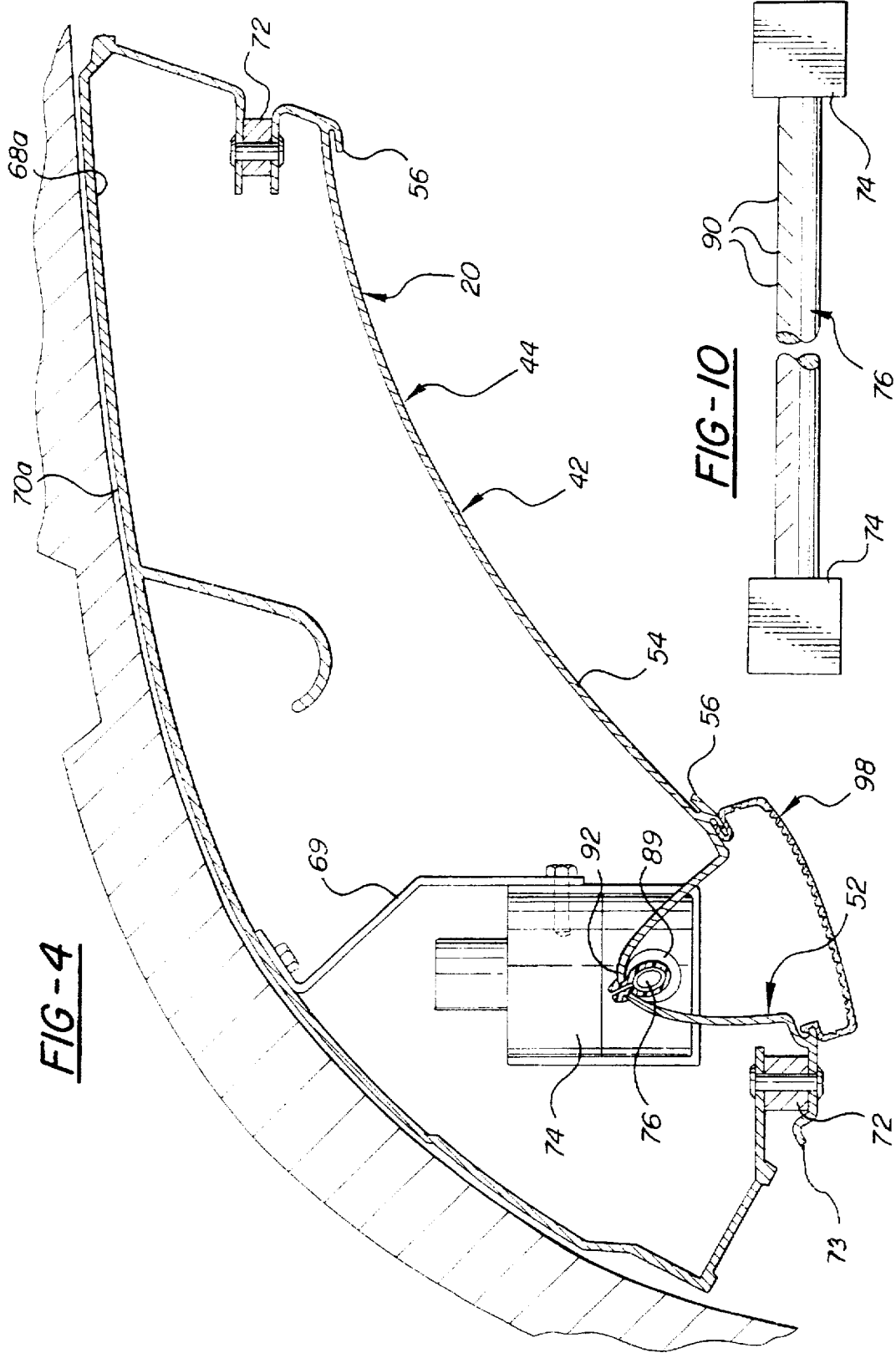
FIG. 4 is a cross-sectional end view of a light fixture constructed in accordance with this invention.

Each face panel 44, 46, 48, 50, 50' is made as a pultrusion from opaque resin and glass fibers so as to have an elongated shape of a uniform cross-section along its length. Each segment of the lamp housing 52 is integrally pultruded with one of the face panels 44, 46, 48, 50, 50' to form a unitary piece. As shown in FIGS. 1, 2, and 4, each lamp housing segment 52A, 52B, 52C, is disposed below the bottom edge of the display panel 54 in its respective face panel 44, 46, 48, 50, 50'.

The light fixture 42 encloses and defines an elongated air duct as shown at 68 in FIGS. 1, 2 and 4. The face panels 44, 46, 48, 50, 50' serve as the inner walls of the duct 68. The remainder of the duct 68 is defined by the vehicle duct panel 70. Each face panel 44, 46, 48, 50, 50' is fastened along its top and bottom edges to the vehicle duct panel 70. As is shown in FIG. 4, spacers 72 are included between the face panels 44, 46, 48, 50, 50' and the vehicle duct panel 70 to allow conditioned air, either heated or cooled, to pass from the duct 68 into the passenger compartment 24. In other embodiments, the face panels 44, 46, 48, 50, 50' may be fastened directly to the side wall 26 of the passenger compartment 24 in a cornice area rather than to a vehicle duct panel 70.

Two light sources, shown at 74 in FIGS. 3, 4, 5, 7, 10 and 15, are mounted in the vehicle 22 adjacent the passenger compartment 24. More specifically, one light source 74 is mounted at each end of the fixture 42 with each light source 74 disposed behind one of the two access face panels 50, 50' adjacent the forward 28 and aft bulkheads 30. The light sources 74 are mounted behind the access face panels 50, 50' to allow easy access for maintenance and replacement of light source components such as burned-out bulbs. In other embodiments there may be more or fewer light sources 74 and they may be mounted at any location within the vehicle 22.

Figure 5:
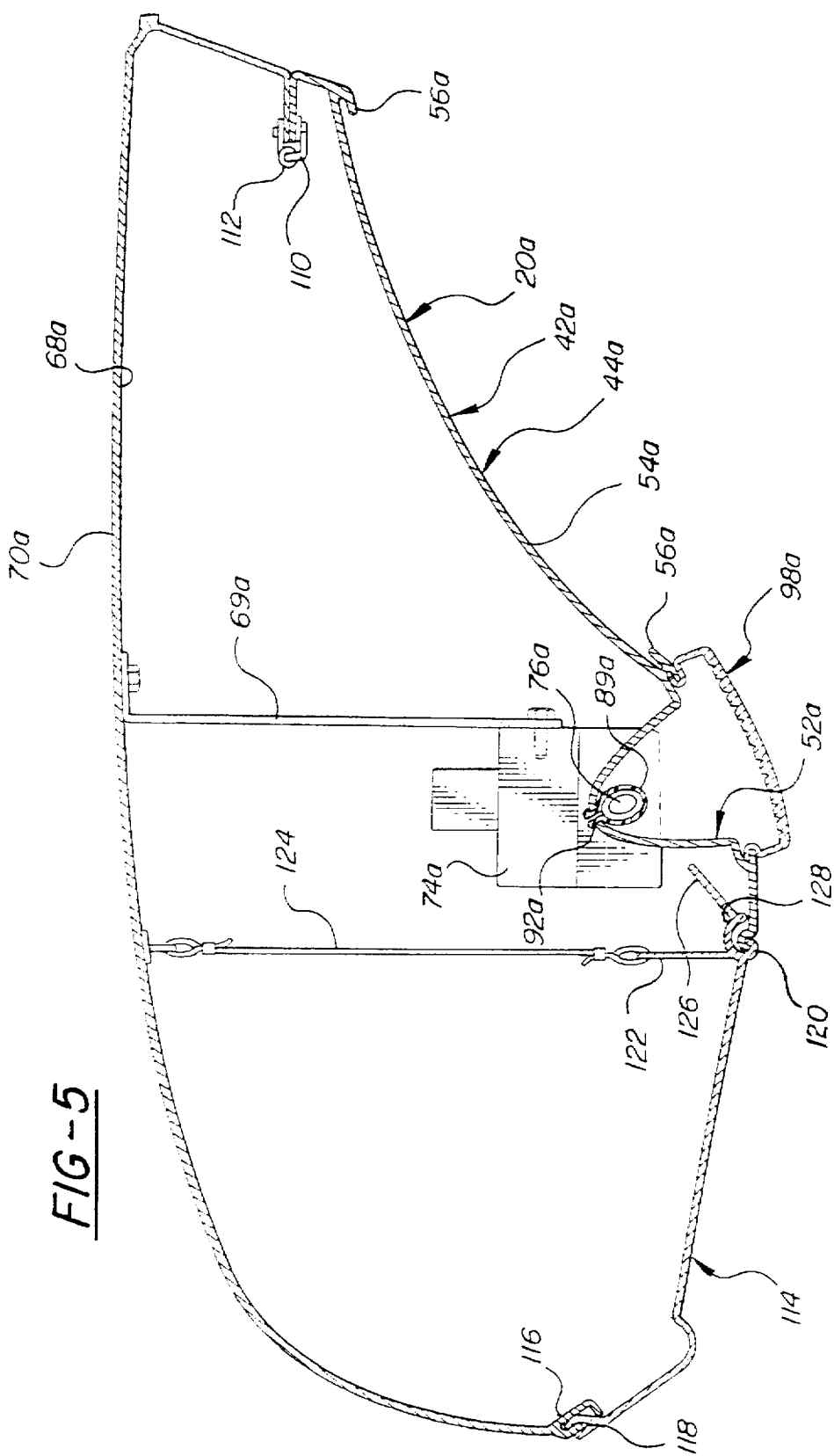
FIG. 5 is a cross-sectional end view of a second light fixture embodiment constructed in accordance with this invention.
Figure 7:
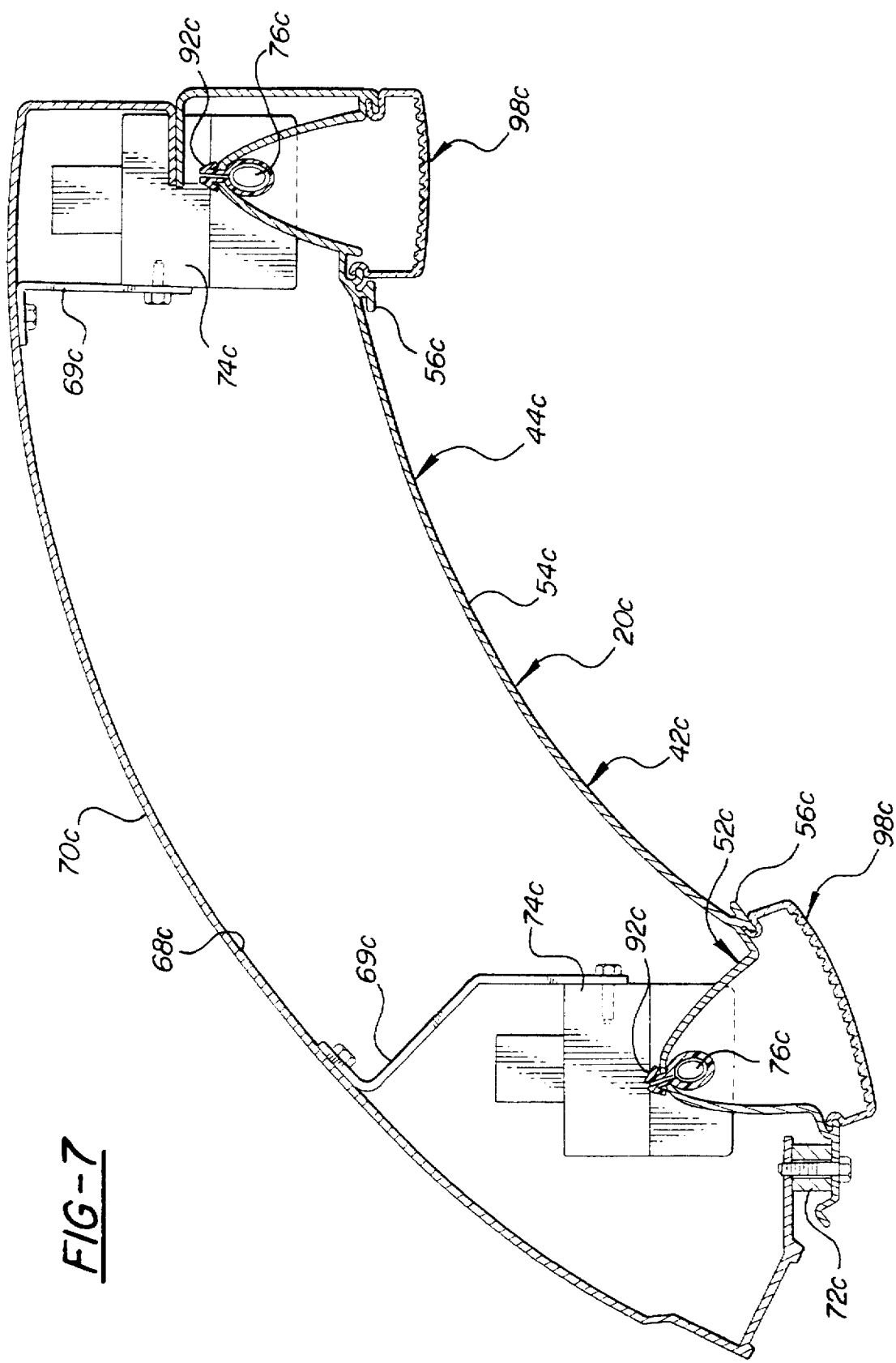
FIG. 7 is a cross-sectional end view of a fourth light fixture embodiment constructed in accordance with this invention.

As shown in FIGS. 4, 5 and 7, the light sources 74 are disposed within the air duct 68 that runs through the fixture 42. In operation, the flow of cool air through the air duct 68 can help the light sources 74 convectively reject heat.

The light sources 74, commonly known as "light engines", are electrically-energized and include halogen illuminators. The illuminators may be quartz-halogen or may use a metal halide illuminator such as that described in U.S. Pat. No. 4,704,660 granted Nov. 3, 1987 to Robbins et al. Such light sources 74 are available from General Electric Company and Lumenyte International Corporation.

The lighting system 20 includes a switch mounted in the vehicle 22 and an electrical energizing circuit that extends from the switch to each light source 74. The switch may be of any suitable type known in the art.

The lighting system 20 includes three elongated light pipes, generally indicated at 76, 78 and 80 in FIGS. 1–12 and 15. The light pipes 76, 78, 80 are coupled end-to-end in a series. The series extends longitudinally above the seating area 38 and between two light sources 74 and runs adjacent and parallel to the segmented lamp housing 52.

As is shown in FIG. 3, the three elongated light pipes include a forward pipe 76 supported within the forward face panel 44, a center pipe 78 supported within the center face panel 48 and an aft pipe 80 supported within the aft face panel 46. The forward 76 and aft 80 pipes receive light at one end, transmit the light along their lengths and longitudinally emit it from their other ends while laterally emitting it from along their lengths into the passenger compartment 24. The center pipe 78 receives light at both ends from the forward 76 and aft 80 pipes and laterally emits it from along its length into the passenger compartment 24.

Figure 15:
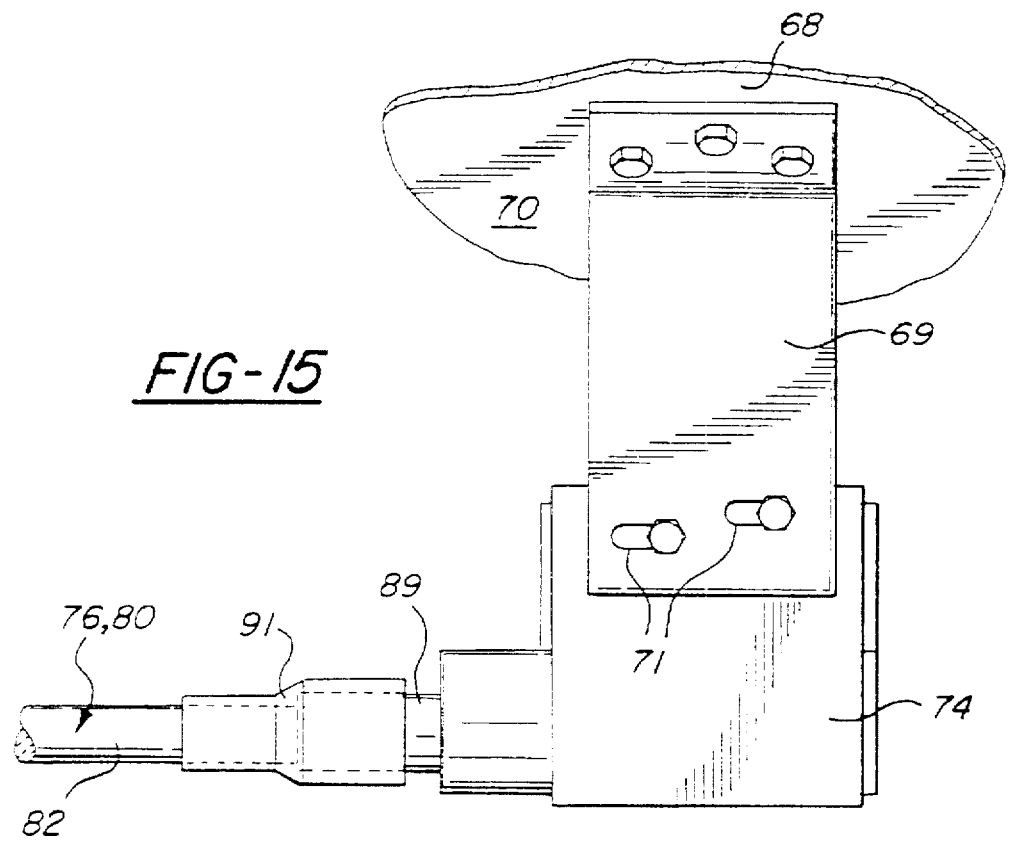
FIG. 15 is a front view of the light engine shown in FIG. 4.

When installing the lighting system 20 the light sources 74 are installed before the light pipes 76, 78, 80. Because the forward 76 and aft 80 pipes must insert into cylindrical receptacles 89 in the light sources 74, the light sources 74 must be moved out of the way when the forward 76 and aft 80 pipes are installed. To facilitate light source 74 movement, each light source 74 is supported within the air duct 68 by a mounting bracket 69 that includes elongated mounting holes 71. As shown in FIG. 15, the elongated mounting holes 71 allow the light sources 74 to be slid away from the light pipes 76, 80. After the light pipes 76, 78, 80 are installed, the light sources 74 are slid back inward to engage and optically couple with the forward 76 and aft 80 pipes. Alternatively, the light sources 74 may be pre-mounted to the light pipes and fastened into place after the light pipes 76, 78, 80 are installed.

As shown in FIG. 3, the forward 76 and aft 80 light pipes have each have an input end 82 and an output end 84. The center light pipe 78 has a forward input end 86 and an aft input end 88. Each of the input ends 82 of the forward 76 and aft 80 light pipes is optically coupled to one of the two light sources 74. The cylindrical receptacles 89 in the light sources 74 receive the input ends 82. As shown in FIG. 15, heat-shrink tubing 91 may be used to secure the input ends 82 in the receptacles 89.

The output ends 84 of the forward 76 and aft 80 light pipes are optically coupled to the forward 86 and aft 88 input ends of the center light pipe 78, respectively. The optical couplings between the light pipes 76, 78, 80 allow the forward 76 and aft 80 light pipes to transmit light from the light sources 74 into the center light pipe 78.

Each elongated light pipe 76, 78, 80 is a solid-core semi-rigid fiber optic. The core section of each pipe 76, 78, 80 is made of a soft acrylic.

However, other embodiments may use other light-transmissive materials in lieu of soft-cored semi-rigid optics, e.g., Dupont Lucite® rods having circular cross-sections and diameters of approximately ⅝ of an inch.

Figure 11:
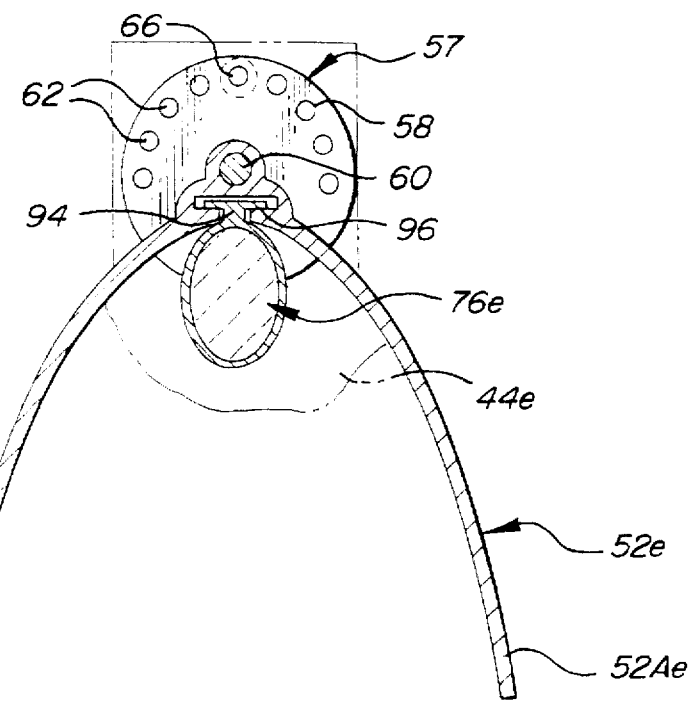
FIG. 11 is a cross-sectional end view of an alternative lamp housing, light pipe and indexing plate.

The core of each light pipe 76, 78, 80 is encased in a cladding having an index of refraction which causes the cladding to emit light laterally. The cladding is made of Teflon®. However, in other embodiments, the cladding may be made of other materials with similar light dispersing characteristics. A clear, semi-rigid jacket surrounds the cladding to reflect a pre-determined portion of the laterally-emitted light back into the core. As is best shown in FIG. 11, each pipe 76, 78, 80 has an oval cross section oriented to optimally concentrate the lateral emission of light.

A light pipe of the type described above is commonly referred to as an "optic." Optics that include cladding to disperse light laterally are commonly referred to as "side-light" or "side-fire" optics. This type of optical pipe is described in U.S. Pat. No. 4,957,347 granted Sep. 18, 1990 to Zarian, incorporated herein by reference. Side-light optical pipes are available from Lumenyte Corporation.

To provide controlled distribution of light, each pipe 76, 78, 80 also includes angled cuts 90 disposed along its length as shown in FIG. 10. The cuts 90 create discontinuities in the pipes, 76, 78, 80 that increase the amount of light emitted laterally. The cuts 90 have depths, angles & spacing optimized for even light distribution from along the length of each pipe 76, 78, 80. Side-light optical pipes with cuts or interruptions fabricated into the optic are available from Lumenyte Corporation under the trade name LUMENYTE® STARBURST™ OPTIC.

Figure 14:
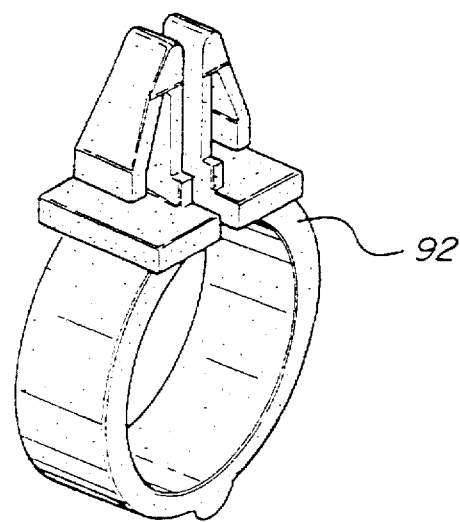
FIG. 14 is a perspective view of the mounting clip.

A plurality of mounting clips, shown at 92 in FIGS. 4, 5, 6, 7 and 14, extend from the lamp housing 52 to support the light pipes 76, 78, 80 at spaced locations along their lengths and to hold the pipes 76, 78, 80 a predetermined distance from the inner reflective concave surface of the lamp housing 52. As is best shown in FIG. 14, the mounting clips are split-ring force-fit snap-engagement mounting clips. Other embodiments may use other means to support the light pipes 76, 78, 80 such as wire or plastic slings.

Figure 8:
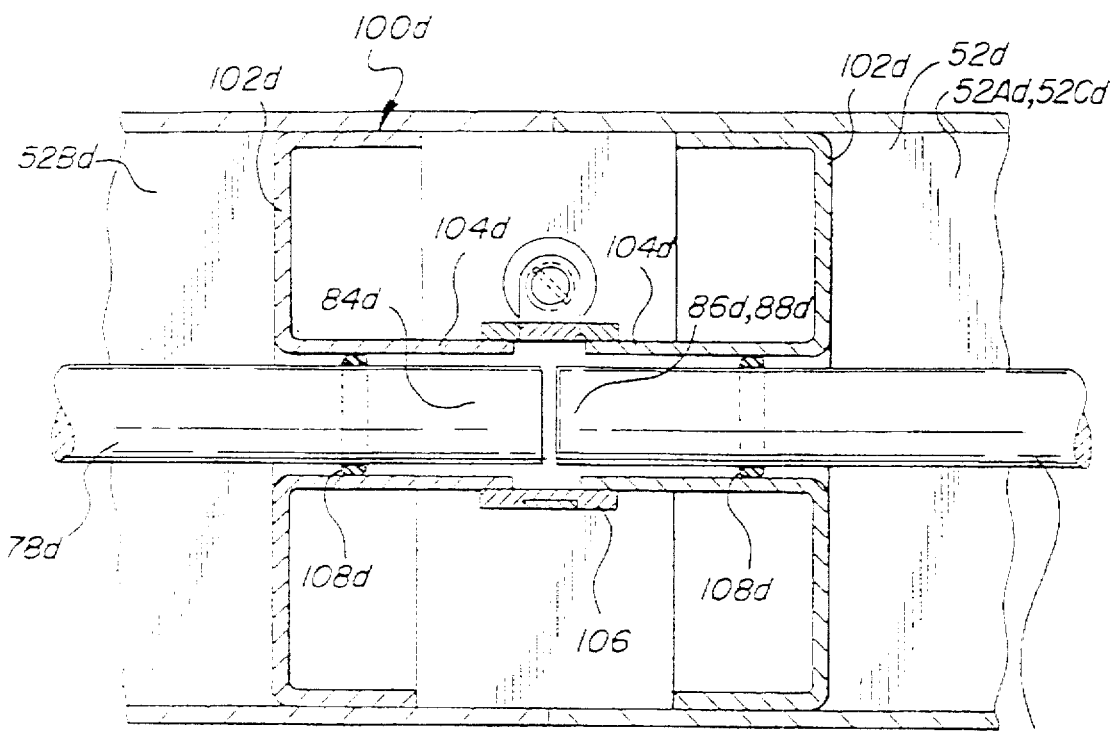
FIG. 8 is a fragmentary cross-sectional bottom view of an alternative coupling means constructed in accordance with this invention.
Figure 9:
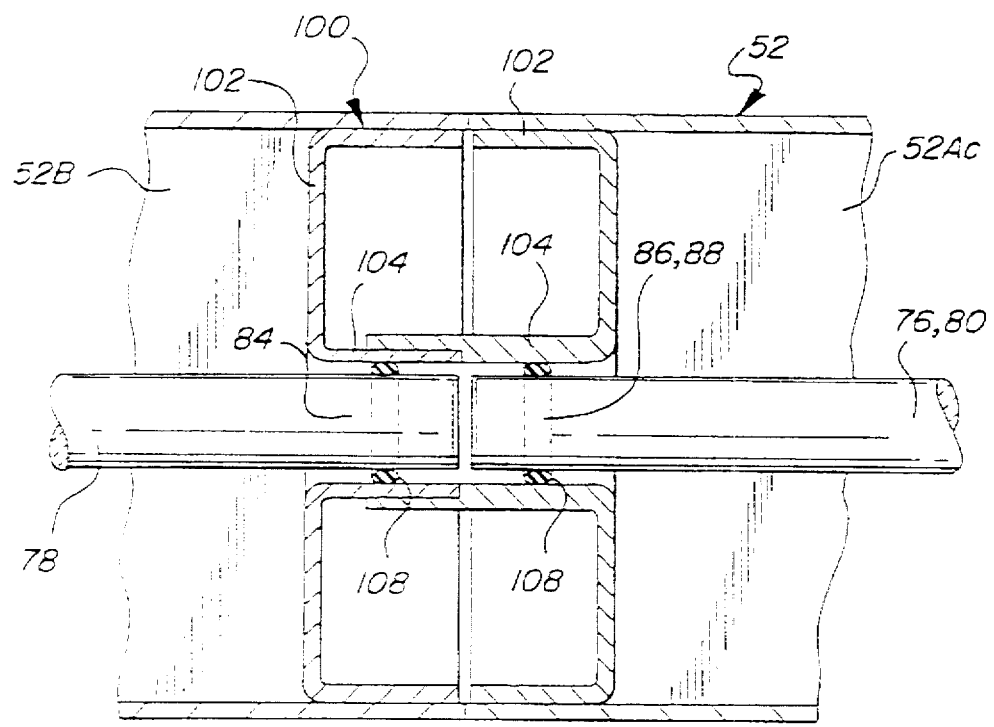
FIG. 9 is a fragmentary cross-sectional bottom view of a coupling means constructed in accordance with this invention.

The light fixture 42 also includes an elongated translucent segmented fluted lens, shown at 98 in FIGS. 1, 2, 4, 5, 6 and 7. Each of five fluted lens segments 98A, 98B, 98C, 98D, 98D' is formed as a U-shaped channel. The lens segments 98A, 98B, 98C, 98D, 98D' are each supported on one of the face panels 44, 46, 48, 50, 50' between a light pipe 76, 78, 80 and the seating area 38. Each lens segment 98A, 98B, 98C, 98D, 98D' brackets and covers a U-shaped lamp housing segment 52A, 52B, 52C, 52D, 52D' to form an enclosed elongated light pipe housing segment with open ends. As shown in FIGS. 8 and 9, end fittings 102 are installed in the open ends of each pipe housing segment. The end fittings 102 include holes to allow light pipe passage as is described in greater detail below. A forward lens segment 98A covers the forward lamp housing segment 52A, a center lens segment 98B covers the center lamp housing segment 52B, an aft lens segment 98C cover the aft lamp housing segment 52C, a forward access lens segment 98D covers the forward access lamp housing segment 52D and an aft access lens segment 98D' covers the aft access lamp housing segment 52D'. When the face panels 44, 46, 48, 50, 50' are installed and connected together, the pipe housing segments are aligned and joined together into a single dust-resistant light pipe housing that runs the length of the passenger compartment 24.

Two coupler means, generally indicated at 100 in FIGS. 8 and 9, are supported at spaced locations along the lamp housing 52 and within the segmented pipe housing to slidably support the optically coupled ends 84, 86, 88 of the light pipes 76, 78, 80. One coupler means 100 is disposed at each location where two light pipe ends 84, 86, 88 are optically coupled. Therefore, each coupler means 100 slidably supports two optically-coupled light pipe ends 84, 86, 88 and maintains them in longitudinal optical alignment. Each coupler means 100 facilitates optical light transmission between the light pipes 76, 78, 80 while allowing the light pipes 76, 78, 80 to expand and contract longitudinally.

As shown in FIG. 9, each coupler means includes two face panel end fittings 102. Each face panel end fitting 102 is fixed at the end of a pipe housing section between a lamp housing segment 52A, 52B, 52C and its attached lens segment 98A, 98B, 98C. The end fittings 102 are shaped to fit into the cross-sectional area between the lamp housing 52 and fluted lens 98. The end fittings 102 may be fixed in place by glue or any other suitable fastening means.

A tubular receptacle 104 extends longitudinally through each face panel end fitting 102. The tubular receptacles 104 are shaped to receive the ends 84, 86, 88 of the light pipes 76, 78, 80. As shown in FIG. 9, each end fitting 102 includes either a male or a female tubular receptacle 104 to allow adjacent lamp housing segments 52A, 52B, 52C to slide together and telescopically interconnect.

An o-ring seal 108 is seated within each tubular receptacle 104. Each o-ring seal 108 slidably and sealingly encircles one of the optically-coupled light pipe ends 84, 86, 88. The seals 108 keep the space between the optically-coupled light pipes 76, 78, 80 free of dust, insects and other contaminants that would otherwise inhibit light transmission.

Second, third, fourth, and fifth embodiments of the light-ing system are generally indicated at 20$a$, 20$b$, 20$c$, and 20$f$ in FIGS. 5, 6, 7 and 16 respectively. Reference numerals with the suffix "a" in FIG. 5, "b" in FIG. 6, "c" in FIG. 7 and "f" in FIG. 16 designate alternative configurations of each element common to the first embodiment described above. Unless otherwise indicated, we intend the description of elements in the first embodiment to apply equally to elements in the second, third, fourth and fifth embodiments that carry the same reference numerals, but with suffixes "a", "b", "c" or "f".

The second embodiment of the invention includes a plurality of elongated air duct extension panels, generally indicated at 114 in FIG. 5. The extension panels 114 space the face panels 44$a$, 46$a$, 48$a$, 50$a$, 50$a'$ farther from the passenger compartment side walls 26$a$ to increase the cross-sectional area of the air duct 68$a$ they enclose. As with the face panels, each extension panel 114 is made as a pultrusion from opaque resin and glass fibers so as to have an elongated shape of a uniform cross-section along its length.

Each extension panel 114 has an elongated groove 118 extending along its outer edge. Where, as in FIG. 5, a vehicle duct panel 70 is installed in the cornice area of the vehicle 22, the elongated groove 118 of each extension panel 114 engages an elongated duct receptacle 116 formed along the lower edge of the vehicle duct panel 70. In applications where no vehicle duct panel 70 is installed, the outer edge fastens or hooks into a side wall receptacle located just above the side windows 34.

An elongated, upwardly-curved roll-in hook 120 is formed along the inner edge of each extension panel 114. An elongated vertical fin 122 extends upward from along the inner edge of each extension panel 114 adjacent the hook 120. A support strap 124 connects to each vertical fin 122 and extends upward to connect to the vehicle duct panel 70 or vehicle ceiling 40.

An elongated angled fin 126 extends upwardly and outwardly from along the inner edge of each extension panel 114 adjacent the hook 120. Each angled fin 126 runs parallel to each corresponding vertical fin 122 defining a wiring harness raceway 128.

Figure 13:
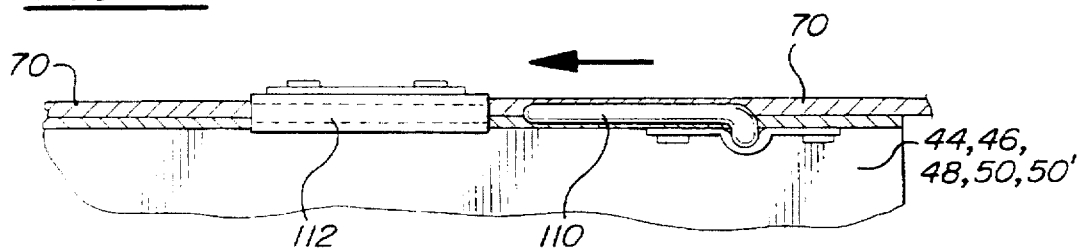
FIG. 13 is a detail view of the light fixture mounting pin and socket.

The face panels 44$a$, 46$a$, 48$a$, 50$a$, 50'$a$ in the second embodiment are identical to those in the first embodiment, but are installed differently. To install each face panel 44, 46, 48, 50, 50' according to the second embodiment, an installer first installs the air duct extension panels 114. The installer then hooks the downwardly-curved roll-in hook 73 of each face panel 44, 46, 48, 50, 50' over the upwardly-curved roll-in hook 120 of each duct extension panel 114. In this way, each face panel pivotally engages the inner edge of a duct extension panel 114. The installer then pivots each face panel 44, 46, 48, 50, 50' upward until its top edge contacts the upper edge of the vehicle duct panel 70. As shown in FIGS. 5 and 13, cylindrical sockets 112 are attached along the upper edge of the vehicle duct panel 70. As is also shown in FIGS. 5 and 13, at least one latch in the form of a mounting pin 110 is attached to the upper edge of each panel 44, 46, 48, 50, 50' so as to align axially with the cylindrical sockets 112 when each panel 44, 46, 48, 50, 50' is pivoted upward into contact with the vehicle duct panel 70. After pivoting each individual panel upwards, the installer slides each panel 44, 46, 48, 50, 50' laterally so that each of the mounting pins 110 slide into one of the cylindrical sockets 112. The latch need not be in the form of a mounting pin 110, but may be of any configuration that allows an installer to laterally slide each panel 44, 46, 48, 50, 50' into engagement with the vehicle duct panel 70.

Figure 6:
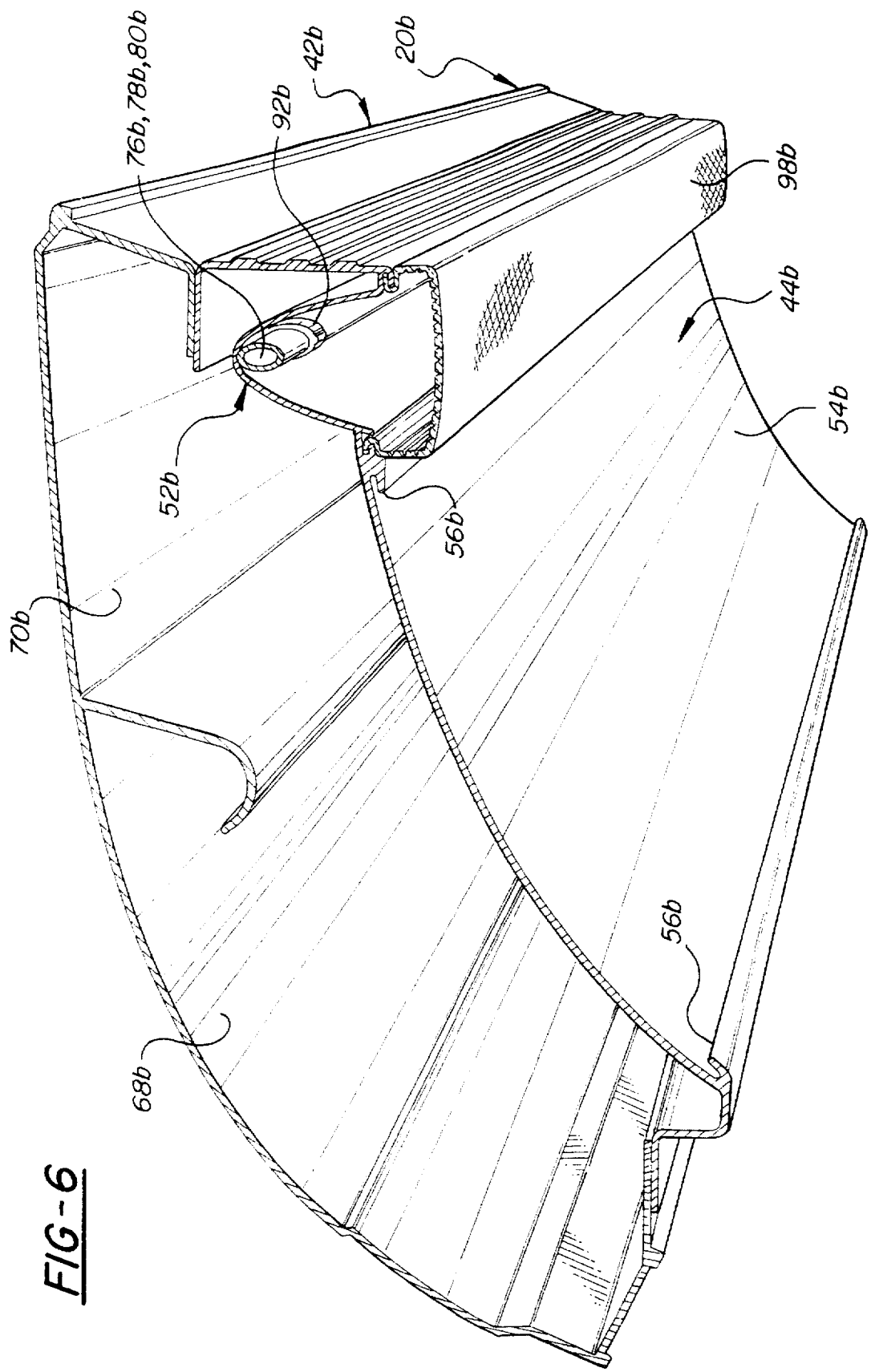
FIG. 6 is a perspective view of a third light fixture embodiment constructed in accordance with this invention.

The third embodiment of the lighting system 20 shown at 20b in FIG. 6 includes a segment lamp housing 52b disposed along the top edge of each display panel 54b. The fourth embodiment of the lighting system 20 shown at 20c in FIG. 7 includes lamp housing segments 52Ac, 52Bc, 52Cc, 52Dc, 52Dc' disposed along both the top and bottom edges of each display panel 54c.

The fourth embodiment shown in FIG. 7 uses four light sources 74c instead of two. In this embodiment, two of the four light sources 74c are mounted adjacent the forward bulkhead 28 and the other two light sources 74c are mounted adjacent the aft bulkhead 30.

Figure 12:
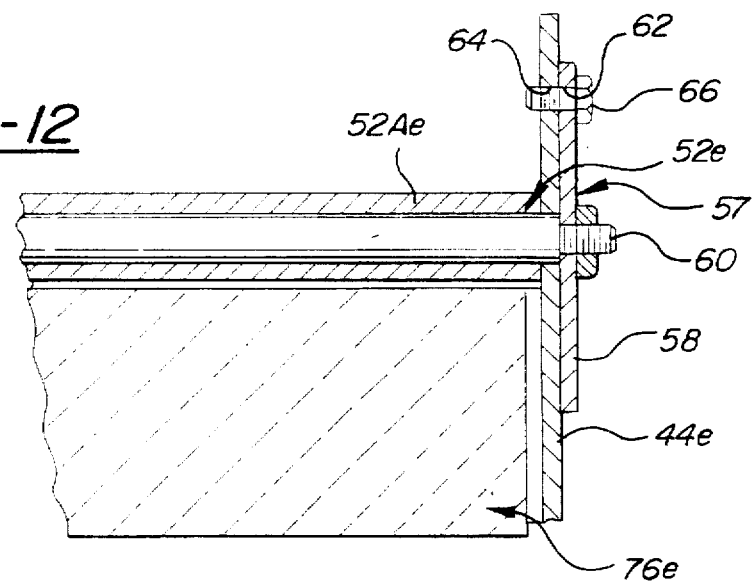
FIG. 12 is a partial cross-sectional side view of the alternative lamp housing, light pipe and indexing plate.

FIGS. 11 and 12 depict an alternative embodiment of the face panels 44, 46, 48, 50, 50' and the segmented lamp housing 52 representatively shown at 44e and 52e, respectively. Reference numerals with the suffix "e" in FIGS. 11 and 12 designate the alternative configuration of each element common to the first embodiment. Unless indicated otherwise, where reference numerals appear in the description of the first embodiment without a suffix, we intend the description to apply equally to elements in FIGS. 11 and 12 indicated by the same reference numeral, but with the suffix "e".

FIGS. 11 and 12 depict an alternative segmented lamp housing 52e with three lamp housing segments representatively indicated at 52Ae. The lamp housing segments 52Ae are formed separately and attached to corresponding face panels 44, 46, 48. FIGS. 11 and 12 show one end of a single exemplary lamp housing segment 52Ae. Each segment of the lamp housing 52e is supported in one of the face panels 44e, to pivot about a longitudinal axis. An indexing means 57 is operatively connected between each lamp housing segment 52Ae and the face panel 44e it is mounted on. The indexing means 57 allows an installer to incrementally adjust the direction that each segment of the lamp housing 52e will reflect light into the passenger compartment 24.

The indexing means 57 includes an indexing plate 58 that is fixed to one or both ends of each lamp housing segment 52Ae and pivots with each lamp housing segment 52Ae, on a pivot pin 60. The pivot pin 60 extends inward from the face panel 44e. The indexing plate 58 includes a plurality of plate holes 62 and the face panel 44e includes a single indexing hole 64 radially aligned with the plate holes 62 about the pivot pin 60. An indexing pin 66 or bolt is insertable through the indexing hole 64 and any one of the plate holes 62. To change the pivotal position of a lamp housing segment 52Ae, an installer need only remove the indexing pin 66, rotate the lamp housing segment 52Ae and indexing plate 58 until a different plate hole 62 aligns with the indexing hole 64, then insert the indexing pin 66 to lock the indexing plate 58 and lamp housing segment 52Ae against pivoting relative to its associated face panel 44e.

Also shown in FIG. 11 is an alternative structure for supporting the light pipes 76e in the segmented lamp housing 52e. Instead of using the split-ring clips for support, the light pipes 76e in this embodiment may each include a elongated mounting fin 94 with a T-shaped cross-section that integrally extends from along their lengths. The T-shaped mounting fins 94 are adapted to slide into a T-shaped channel 96 formed into the concave inner surface of each lamp housing segment 52Ae.

An alternative coupler means is shown at 100d in FIG. 8. Reference numerals with the suffix "d" in FIG. 8 designate the alternative configuration of each element common to the first embodiment. Unless indicated otherwise, where the description of the first embodiment refers to an element with a reference numeral having no suffix, we intend the description to apply equally to elements in FIG. 8 indicated by the same reference numeral, but with the suffix "d".

In the alternative embodiment depicted in FIG. 8, the coupling means 100d includes a cylindrical clamp member 106. The clamp member 106 surrounds the tubular receptacles 104d of adjacent end fittings 102d and binds them end-to-end. In this alternative embodiment the end fittings 102d are identical to one another and the tubular receptacles 104d are longer than in the first embodiment.

The fifth embodiment of the invention includes a plurality of light fixtures of like construction which are representatively illustrated by the single light fixture generally indicated at 20f in FIG. 16. The lighting fixture 20f of the fifth embodiment is similar in most respects to that of the second embodiment described above with several exceptions, e.g., the fifth embodiment is adapted to accommodate either fluorescent lamps or fiber optic light pipes.

The representative lighting fixture 20f is mounted in the cornice area of the vehicle above the seating area 38 and includes a face panel, generally indicated at 42f in FIG. 16. The face panel 42f includes an upper edge 130 adapted to connect to the vehicle ceiling 40. As with the second embodiment, the light fixture 20f encloses and defines a portion of an elongated air duct 68f and includes an air duct extension panel, generally indicated at 114f in FIG. 16. The air duct extension panel 114f is adapted to mount between the vehicle side wall 26f and the face panel 42f to space the face panel 42f from the side wall 26f. The air duct extension panel 114f has an inner edge 132 adapted to connect to a lower edge 136 of the face panel 42f, and an outer edge 134 adapted to connect to the vehicle side wall 26f.

The face panel 42f and duct extension panel 114f are each pultruded as unitary members from resin and glass fibers so as to have elongated shapes with uniform cross sections along their respective lengths. A lamp housing, generally indicated at 52f in FIG. 16, is integrally formed as a unitary piece with the face panel 42f and is disposed adjacent and generally parallel to the face panel lower edge 136.

The lamp housing 52f includes an elongated concave portion 138 that opens in the direction that the fixture will provide light to the seating area 38. The lamp housing 52f is disposed adjacent and generally parallel to the face panel lower edge 136 and the duct extension panel inner edge 132. This allows the lamp housing 52f to project light from a position spaced laterally from the side windows 34f and vertically from the ceiling 40. Because the lamp housing 52f is spaced from the windows 34f, its position minimizes side window illumination and reflective glare. Because the lamp housing 52f is spaced from the ceiling 40, its position is closer to the seating area 38 thus maximizing seating area illumination and reducing the amount of light dispersed into the aisle 36 and other portions of the passenger compartment 24.

A male pivotal connector member 73f is disposed along the face panel lower edge 136. The male pivotal connector member 73f pivotally connects the face panel 42f to the air duct extension panel 114f. A female pivotal connector member 120f is disposed along the duct extension panel inner edge 132. The female pivotal connector member 120f receives the male pivotal connector member 73f in a "roll-in"-type engagement.

A suspension member 124f provides support for the duct extension panel 114f from the vehicle ceiling 40 or other overhead structures. The suspension member 124f has a lower end that connects to the duct extension panel 114f adjacent the inner edge 132, and an upper end that connects to the vehicle ceiling 40 or structures attached to the ceiling 40.

An elongated lens, generally indicated at 98f in FIG. 16, is supported between the lamp housing 52f and the seating area 38. The lens 98f is formed as a U-shaped channel with first and second laterally opposite lens edges. The first lens edge includes a "roll-in"-type male lens connector member 140. The male lens connector member 140 pivotally mounts the lens 98f to the face panel 42f adjacent the first of two laterally opposite lamp housing edges that border the elongated concave portion 138 of the lamp housing 52f. A female lens connector member, shown at 142 in FIGS. 16–20, is integrally formed in the face panel 42f adjacent the first lamp housing edge. The female pivotal lens-connector member 142 includes a receptacle 144 that receives the male lens connector member 140 in a "roll-in"-type engagement.

A catch 146 is disposed along the second lens edge and has the shape of a laterally-elongated prong. A corresponding detent 148 is integrally formed in the face panel 42f adjacent the second housing edge and receives the catch 146 in a "snapfit"-type engagement. This allows the lens 98f to be snapped into a closed position over the lamp housing concave portion 138.

The "roll-in" lens connector members 140, 142 and "snap-fit" catch 146 and detent 148 arrangement help prevent dust from entering the lamp housing 52f. The male lens connector member 140 has the shape of a laterally-elongated hook. Moreover, the snap connection between the catch 146 and the detent 148 is dust-resistant. The "roll-in" lens connector members 140, 142 and "snap-fit" catch 146 and detent 148 arrangement help prevent dust from entering the lamp housing 52f along either of the laterally opposite lens edges. A line-contact may be formed between the lens connector members 140, 142 to further reduce dust intrusion. The line contact may be provided along a line where the lip of the female pivotal lens-connector member 142 contacts the male connector member 140. Alternatively, the line contact may be provided along a line where the lip of the male connector member 140 contacts the female connector member 142.

An upper grooved border 152 extends integrally outward from the face panel 42f. The upper grooved border 152 lies adjacent and parallel to the face panel upper edge 130. A lower grooved border 154 similarly lies adjacent and parallel to the face panel lower edge 136 and in opposition to the upper grooved border 152. The upper and lower grooved borders are positioned to hold an advertising card between them.

An upper mounting flange 156 is formed adjacent the face panel upper edge 130. The mounting flange 156 includes fastener openings that receive fasteners to connect the face panel 42f to the ceiling 40. The fastener openings are located between the upper 152 and lower 154 grooved borders so that a card installed between the grooved borders will cover the fastener openings 158 and provide a more aesthetically-pleasing appearance. As shown in FIG. 16, the mounting flange 156 is formed into a channel shape with a triangular cross-section. The mounting flange 156, or mounting "channel", has a channel lower wall 160 that lies flush with the face panel 42f and a channel upper wall 162 designed to contact the vehicle ceiling 40. The mounting channel 156 includes two types of fastener openings: a series of spaced interior fastener holes 164 and an exterior fastener access slot 166. The fastener access slot 166 extends through the mounting channel lower wall 160 and provides tool and fastener access to the mounting channel interior. The interior fastener holes 164 extend through the mounting channel upper wall 162 and receive and engage the fasteners as they are installed through the mounting channel 156 and into the vehicle ceiling 40.

For vehicle applications that do not use advertising cards, a plug strip may be provided to fill the fastener slot 166. The plug strip 168 may be snap-fit, glued in place or fastened by any other suitable method.

The face panel 42f has a panel back surface and the lamp housing 52f has a housing back surface that each face upward toward the vehicle ceiling 40 following installation. A first elongated retainer tab 170 integrally extends longitudinally along the entire length of the lamp housing 52f and laterally from the housing back surface toward the panel back surface. A second elongated retainer tab 172 integrally extends longitudinally along the entire length of the face panel 42f and laterally from the panel back surface toward the first retainer tab 170. The first 170 and second 172 retainer tabs cooperate with the lamp housing 52f and face panel 42f back surfaces to partially enclose and define a wiring harness raceway 174. The retainer tabs 170, 172 laterally extend toward one another leaving a longitudinal slot that runs between them along their entire lengths. The slot provides an elongated access opening for an installer to push wires or wire bundles through and into the raceway as shown at 180 in FIG. 16.

The fixture includes at least one end cap, generally indicated at 176 in FIG. 16, mounted within the lamp housing concave portion 138. The end cap 176 has peripheral edges that engage the lamp housing concave portion 138 and the light cover. The end cap 176 also includes a through-hole 178 shaped to receive a fluorescent bulb socket.

Possible variations on the fifth embodiment of the present invention include the lamp housing 52f being integrally formed as a unitary piece with the duct extension panel 114f instead of the face panel 42f. In addition, a female lens roll-in connector member 142 may be integrally formed in a portion of the lamp housing 52f rather than the face panel 42f so that the male lens connector member 140 may mount to a portion of the lamp housing 52f adjacent and parallel to the first lamp housing edge instead of to the face panel 42f. Also, the "snap-in" lens attachment detent 148 may be integrally formed in or attached to the lamp housing 52f rather than the face panel 42f.

In another possible variation on the fifth embodiment, the end cap 176 may include a through-hole shaped to receive a light pipe rather than a fluorescent bulb socket. Where light pipes are optically-coupled to one another and are supported end-to-end through a series of adjacent lighting fixtures, the end cap 176 may also comprise a portion of a coupler adapted to slidably support the optically-coupled ends of two adjacent light pipes. Examples of couplers of this type are shown at 100d and 100 in FIGS. 8 and 9, respectively. To support the light pipe at spaced locations along its length, a plurality of mounting clips or holes for receiving mounting clips may be included in the lamp housing 52f. An example of such a mounting clip is shown at 92 in FIG. 14.

The face panel 42f of the fifth embodiment may be modified for use without the duct extension panel 114f. For attachment directly to a vehicle side wall 26f or other associated structures, the face panel 44f may be modified at its lower edge as shown at 132g, 136h, and 136i in FIGS. 17, 18 and 19, respectively. The upper edge 130 may also be modified as shown in FIG. 18. FIGS. 17, 18 and 19 show different upper 130 and lower 136 edge configurations suited to particular vehicle applications. Other combinations of the upper 130 and lower 136 edges shown in FIGS. 16, 17, 18, 19 may be used to adapt a face panel 42 to fit various vehicle interior configurations. For example, the upper edge 130h shown in FIG. 18 may be included on the face panel 42f of FIG. 16. Reference numerals with the suffix "g" in FIG. 17, "h" in FIG. 18 and "i" in FIG. 19 designate alternative configurations of each element common to the fifth embodiment described above. Unless otherwise indicated, we intend the description of elements in the fifth embodiment to apply equally to elements shown in FIGS. 17, 18 and 19 that carry the same reference numerals, but with suffixes "g", "h" or "i".

This is an illustrative description of the invention using words of description rather than of limitation. Obviously, many modifications and variations of this invention are possible in light of the above teachings. Within the scope of the claims one may practice the invention other than as described.

What is claimed is:

1. In a mass-transit vehicle having a passenger compartment with a ceiling, side walls, cornice areas, side windows, an aisle extending along a longitudinal axis of the vehicle and a passenger seating area on one side of the aisle, a lighting system for preferentially illuminating the seating area and minimally illuminating the aisle and side windows, said lighting system comprising:

a lighting fixture mounted in one of the cornice areas above the seating area, said fixture comprising an elongated lamp housing with an elongated concave portion that opens in a direction that said fixture will provide light;

said fixture additionally comprising an air duct extension panel having an outer edge adapted to connect to one of the vehicle side walls, said lamp housing supported adjacent and generally parallel to an inner edge of said duct extension panel opposite said duct extension panel outer edge to space said lamp housing laterally inward from the side wall and side windows to minimize side window illumination;

said fixture additionally comprising a face panel having an upper edge adapted to connect to the vehicle ceiling and a lower edge adapted to connect to said inner edge of said duct extension panel adjacent said lamp housing to space said lamp housing downward from the ceiling and closer to the seating area to maximize seating area illumination;

said elongated lamp housing integrally formed as a single-piece unitary member with one of said face and duct extension panels to strengthen said light fixture while reducing attachment hardware requirements and simplifying assembly and installation.

2. A lighting system as defined in claim 1 wherein said face panel and duct extension panel are unitary pultrusions having elongated shapes with uniform cross sections.

3. A lighting system as defined in claim 2 wherein said lamp housing is integrally formed as a unitary piece with said face panel and is disposed adjacent and generally parallel to said face panel lower edge.

4. A lighting system as defined in claim 2 wherein said face panel includes a male pivotal connector flange disposed along said bottom edge, said male pivotal connector flange adapted to pivotally connect said face panel to said air duct extension panel; and where said duct extension panel includes a female pivotal connector flange disposed along said inner edge, said female pivotal connector flange adapted to receive said male pivotal connector flange in a "roll-in"-type engagement.

5. A lighting system as defined in claim 2 wherein said fixture includes a suspension member having a lower end connected to said duct extension panel adjacent said inner edge, said suspension member having an upper end adapted to connect to the vehicle ceiling.

6. A lighting system as defined in claim 5, wherein said lamp housing has first and second laterally opposite housing edges bordering said elongated concave portion and said lens has first and second laterally opposite lens edges, and where said lens includes a male pivotal connector flange disposed along said first lens edge, said male pivotal connector flange adapted to pivotally mount said lens to one of said face panel and said lamp housing adjacent and parallel to said first lamp housing edge; and where said fixture includes a female pivotal connector flange integrally formed in one of said face panel and said lamp housing adjacent said first lamp housing edge, said female pivotal connector flange adapted to receive said male pivotal connector flange in a "roll-in"-type engagement; and where said lens includes a catch disposed along said second lens edge, said catch adapted to snap said lens into a closed position over said lamp housing concave portion; and where said fixture includes a detent integrally formed in one of said face panel and said lamp housing adjacent said second housing edge, said detent adapted to receive said catch in a "snap-fit"-type engagement.

7. A lighting system as defined in claim 2 wherein said light fixture includes an elongated lens supported between said lamp housing and the seating area.

8. A lighting system as defined in claim 2 wherein said male pivotal connector flange comprises a hook flange having a front side and a back side and where said hook flange front and back sides each includes a line contact.

9. A lighting system as defined in claim 2 wherein said face panel includes an upper grooved border adjacent and parallel to said upper edge and a lower grooved border adjacent and parallel to said lower edge, said upper and lower grooved borders adapted to hold an advertising card between them.

10. A lighting system as defined in claim 9 wherein said face panel includes a top mounting flange formed adjacent said top edge, said mounting flange including fastener openings adapted to receive fasteners to connect said face panel to the roof, said fastener openings disposed between said upper and lower grooved borders.

11. A lighting system as defined in claim 2 wherein said face panel has a panel back surface and where said lamp housing has a housing back surface, and where said fixture includes first and second elongated retainer tabs, said first retainer tab integrally extending from said housing back surface toward said panel back surface and said second retainer tab integrally extending from said panel back surface toward said first retainer tab, said first and second retainer tabs partially enclosing and defining a wiring harness raceway with said housing and panel back surfaces.

12. A lighting system as defined in claim 2 wherein said fixture includes at least one end cap mounted within the lamp housing concave portion, said end cap having peripheral edges that engage the housing.

13. A lighting system as defined in claim 12 wherein said end cap includes a through-hole adapted to receive a fluorescent bulb socket.

14. A lighting system as defined in claim 12 wherein said end cap includes a through-hole adapted to receive a light pipe.

15. A lighting system as defined in claim 14 wherein said fixture includes a plurality of mounting clips extending from said lamp housing, said plurality of mounting clips adapted to support a light pipe at spaced locations along its length.

16. A lighting system as defined in claim 14 wherein said end cap comprises a coupler adapted to slidably support one end of a light pipe.

17. A lighting system as defined in claim 2 wherein said light fixture encloses and defines an elongated air duct.

18. In a mass-transit vehicle having a passenger compartment with a ceiling, side walls, cornice areas, side windows, an aisle extending along a longitudinal axis of the vehicle and a passenger seating area on one side of the aisle, a lighting system for preferentially illuminating the seating area and minimally illuminating the aisle and side windows, said lighting system comprising:

a lighting fixture mounted in one of the cornice areas above the seating area, said fixture comprising an elongated lamp housing with an elongated concave portion that opens in a direction that said fixture will provide light;

said fixture additionally comprising an air duct extension panel having an outer edge adapted to connect to one of the vehicle side walls, said lamp housing supported adjacent and generally parallel to an inner edge of said duct extension panel opposite said duct extension panel outer edge to space said lamp housing laterally inward from the side wall and side windows to minimize side window illumination;

said fixture additionally comprising a face panel having an upper edge adapted to connect to the vehicle ceiling and a lower edge adapted to connect to said inner edge of said duct extension panel adjacent said lamp housing to space said lamp housing downward from the ceiling and closer to the seating area to maximize seating area illumination; and said elongated lamp housing integrally formed as a unitary piece with one of said face and duct extension panels to strengthen said light fixture while reducing attachment hardware requirements and simplifying assembly and installation;

said face panel and duct extension panel being unitary pultrusions having elongated shapes with uniform cross sections; and said fixture including at least one end cap mounted within the lamp housing concave portion, said end cap having peripheral edges that engage the housing and a through-hole adapted to receive a light pipe.

19. A lighting system as defined in claim 18 wherein said fixture includes a plurality of mounting clips extending from said lamp housing, said plurality of mounting clips adapted to support a light pipe at spaced locations along its length.

20. A lighting system as defined in claim 18 wherein said end cap comprises a coupler adapted to slidably support one end of a light pipe.

* * * * *

UNITED STATES PATENT AND TRADEMARK OFFICE
CERTIFICATE OF CORRECTION

PATENT NO.   :   5,752,760

DATED        :   May19, 1998

INVENTOR(S)  :   Onward K. Dealey, et al.

It is certified that errors appear in the above-identified patent and that said Letters Patent is hereby corrected as shown below:

Column 4, line 64, delete "52D, 52D'." Column 5, line 8, delete "52D, 52D'." Column 9, line 21, after "includes a" delete "segment" and insert therefor --segmented--. Column 13, line 14, after "at" delete "132g" and insert therefor --136g--.

Signed and Sealed this

Twenty-seventh Day of October, 1998

*Attest:*

BRUCE LEHMAN

*Attesting Officer*           Commissioner of Patents and Trademarks